(12) United States Patent
Kaiser et al.

(10) Patent No.: US 8,471,429 B2
(45) Date of Patent: Jun. 25, 2013

(54) ISOLATOR RING FOR AN ELECTRIC MOTOR

(75) Inventors: Edward L. Kaiser, Orion, MI (US); Frederick W. Rhoads, Holly, MI (US); Richard Robertson, Wyandotte, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 658 days.

(21) Appl. No.: 12/690,143

(22) Filed: Jan. 20, 2010

(65) Prior Publication Data

US 2010/0253175 A1   Oct. 7, 2010

Related U.S. Application Data

(60) Provisional application No. 61/167,229, filed on Apr. 7, 2009.

(51) Int. Cl.
*H02K 3/34* (2006.01)
(52) U.S. Cl.
USPC .......................................................... 310/215

(58) Field of Classification Search
USPC ............................................ 310/215, 214, 43
See application file for complete search history.

(56) References Cited

U.S. PATENT DOCUMENTS

| | | | | |
|---|---|---|---|---|
| 5,306,976 A | * | 4/1994 | Beckman | 310/215 |
| 8,222,790 B2 | * | 7/2012 | Sakata | 310/214 |
| 2009/0127969 A1 | * | 5/2009 | Okuyama et al. | 310/215 |
| 2009/0324435 A1 | * | 12/2009 | Sears et al. | 417/423.7 |
| 2010/0264757 A1 | * | 10/2010 | Asou et al. | 310/43 |

FOREIGN PATENT DOCUMENTS

| CN | 2627716 Y | 7/2004 |
|---|---|---|
| JP | 1283037 A | 11/1989 |

\* cited by examiner

*Primary Examiner* — Nguyen N Hanh
(74) *Attorney, Agent, or Firm* — Quinn Law Group, PLLC

(57) ABSTRACT

A stator assembly includes a stator stack and a plurality of conductors extending from the stator stack. An isolator/assembly ring is located on the stator stack. The isolator/assembly ring includes a plurality of inwardly protruding fingers. A method of assembling the stator assembly includes threading the plurality of conductors through the stator stack such that each of the plurality of fingers on the isolator/assembly ring is located between respective ones of the plurality of conductors.

12 Claims, 3 Drawing Sheets

ISOLATOR RING FOR AN ELECTRIC MOTOR

CLAIM OF PRIORITY AND CROSS-REFERENCE TO RELATED APPLICATION

This application claims the benefit of and priority to U.S. Provisional Patent Application No. 61/167,229, filed on Apr. 7, 2009, which is hereby incorporated by reference in its entirety.

TECHNICAL FIELD

The present invention relates, generally, to an electric motor, and more specifically, to an isolator ring for a stator assembly of the electric motor.

BACKGROUND OF THE INVENTION

Electric motors include stator assemblies which have conductors for the motor. In a bar wound stator assembly the conductors are solid copper bars individually threaded into a stator stack. Following threading of the conductors in the stator stack, the conductors are individually twisted into the required positions.

During assembly of the stator assembly, metal tooling is located adjacent to the stator stack on a crown-side of the stator stack. Additional metal tooling is also located on a twist-side of the stator stack. At both the crown-side and the twist-side of the stator stack, the metal tooling is a plurality of metal fingers arranged around the circumference of the stator stack. The fingers extend radially between the individual conductors being threaded into the stator stack.

On the crown-side of the stator stack, the metal fingers assist in maintaining the desired position of the conductors during the assembly and the twisting operation. On the twist-side of the stator stack the metal fingers assist in maintaining the desired position of the conductors and provide guides for twisting the individual conductors during the twist operation. After assembly is complete the metal fingers are removed, leaving space between the conductors. The space, previously occupied by the metal fingers, electrically isolates the conductors from the stator stack and from one another as required for operation of the stator assembly.

SUMMARY OF THE INVENTION

A stator assembly includes a stator stack and a plurality of conductors extending from the stator stack. An isolator ring is located on the stator stack. The isolator ring includes a plurality of inwardly protruding fingers. Each of the inwardly protruding fingers is located between respective ones of the plurality of conductors.

The isolator ring includes a generally annularly shaped main body and the plurality of inwardly protruding fingers. The isolator ring also includes a plurality of attachment features to secure the main body of the isolator ring to the stator assembly. The plurality of attachment features are spaced about the circumference of the main body.

A method of assembling the stator assembly includes securing at least one assembly ring to the stator stack and threading the plurality of conductors through the stator stack such that each of the plurality of fingers on the assembly ring is located between respective ones of the plurality of conductors.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
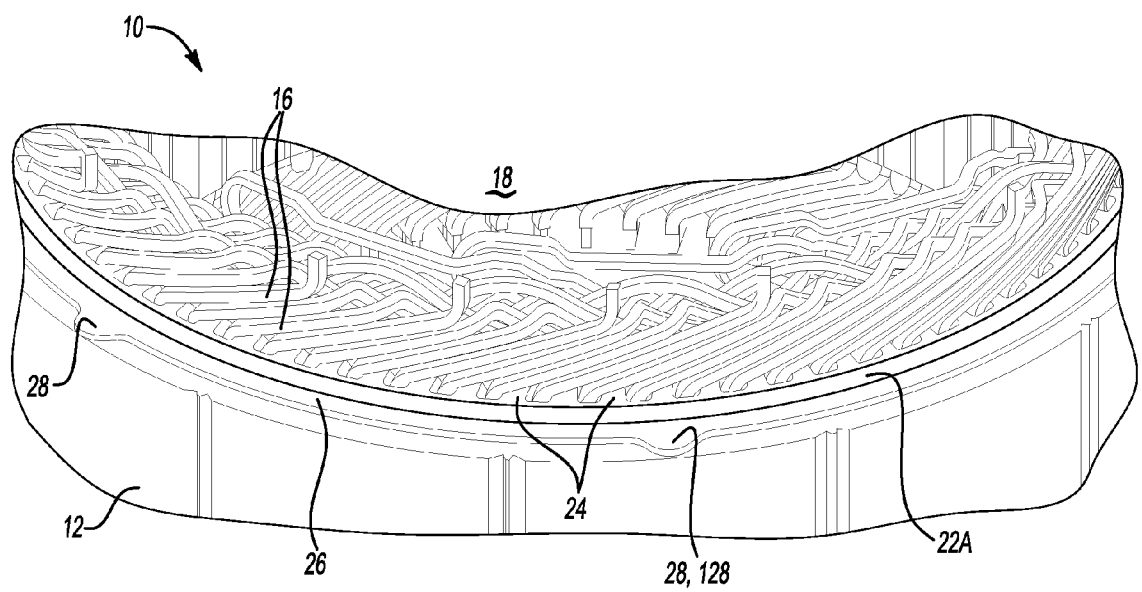
FIG. 1 is a partial schematic perspective illustration of a crown-side of a stator assembly.

Referring to the Figures, wherein like reference numbers refer to the same or similar components throughout the several views, FIG. 1 schematically illustrates a partial view of a stator assembly 10 for an electric motor (not shown). The stator assembly 10 includes a stator stack 12. The stator stack 12 defines a plurality of slots 14 (shown in FIG. 2) which extend entirely through the stator stack 12. A plurality of conductors 16 are threaded through the slots 14 from the crown-side 18 of the stator stack 12. The conductors 16 extend from the crown side 18 of the stator stack 12. The conductors 16 also extend from the slots 14 on a twist-side 20 (shown in FIG. 3) of the stator stack 12. An isolator ring 22A is assembled on the stator stack 12 prior to insertion of the conductors 16. The isolator ring 22A electrically isolates the conductors 16 from one another and from the ends of the stator stack 12.

Because the isolator ring 22A may be assembled on the stator stack 12 prior to insertion of the conductors 16 the isolator ring 22A may also act as an assembly ring to assist in assembly of the stator assembly 10, as described in further detail below. The isolator ring 22A may act as an isolating device, as an assembly device, or as a combination of both an isolating and assembly device and will hereinafter be referred to as an isolator/assembly ring 22A to indicate the possible applications of the isolator/assembly ring 22A. One skilled in the art would be able to determine the particular intent and application on the isolator/assembly ring 22A for a particular stator assembly 10.

The isolator/assembly ring 22A has a generally annular shape and is made from an electrically isolating material, such as plastic. The isolator/assembly ring 22A may be manufactured by injection molding. Alternately, the isolator/assembly ring 22A may be manufactured from a conductive material and coated in an electrically isolating material. The isolator/assembly ring 22A has a plurality of fingers 24. The fingers 24 protrude radially inward from a main body 26 of the isolator/assembly ring 22A. Additionally, attachment features 28 are located around the circumference of the isolator/assembly ring 22A for securing the isolator/assembly ring 22A to the stator stack 12. The attachment features 28 may include various locations about the circumference of the main body 26 for adhering the isolator/assembly ring 22A to the stator stack 12.

Figure 2:
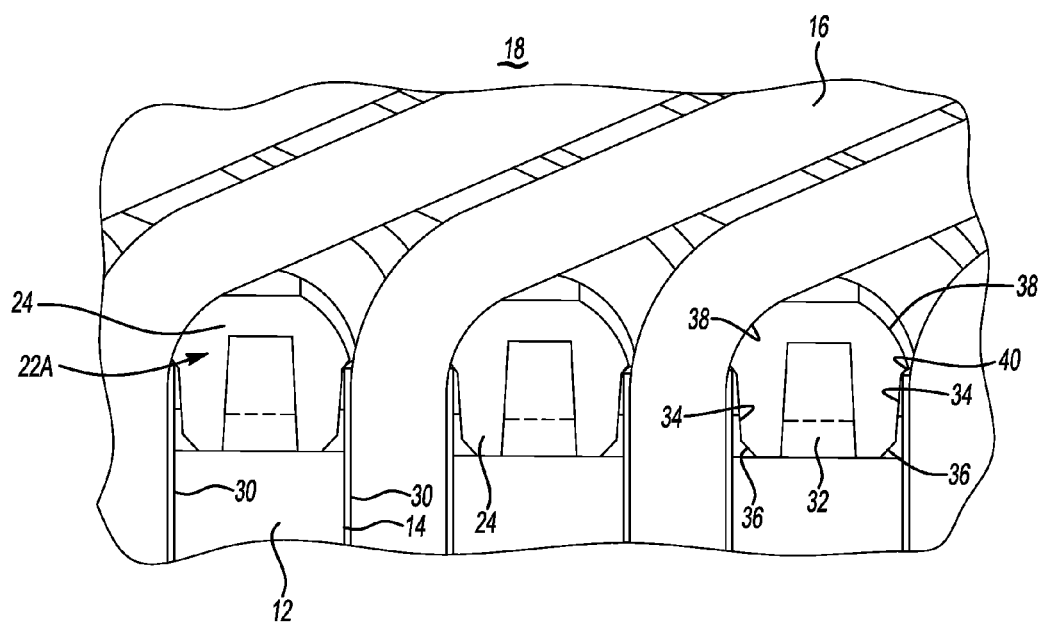
FIG. 2 is an enlarged schematic side-view illustration of a portion of a crown-side of the stator assembly of FIG. 1 showing a portion of an isolator/assembly ring and a plurality of conductors.

FIG. 2 is an enlarged schematic side-view illustration of a portion of the crown-side 18 of the stator assembly 10 showing a portion of the isolator/assembly ring 22A looking outward from the center of the stator stack 12 and the isolator/assembly ring 22A. The conductors 16 extend from the slots 14 in the stator stack 12. Slot liners 30 are located on each side of the slot 14 between the conductors 16 and the stator stack 12. The slot liners 30 isolate the conductors 16 from the stator stack 12.

The fingers 24 of the isolator/assembly ring 22A extend radially inward from the main body 26 (shown in FIG. 1) of the isolator/assembly ring 22A. The isolator/assembly ring 22A rests on an end 32 of the stator stack 12 on the crown-side 18 of the stator assembly 10.

In the embodiment shown, the isolator/assembly ring 22A has generally U-shaped cross-section. The cross-sectional shape of the fingers 24 may vary from one application to another depending on the application for the isolator/assembly ring 22A and the specific stator assembly 10 the isolator/assembly ring 22A is to be used with. Although the U-shape reduces the mass of the isolator/assembly ring 22A the isolator/assembly ring 22A may be solid or have other cross-sectional shapes according to the specific stator assembly 10. One skilled in the art would be able to determined the desired cross-sectional shape of the isolator/assembly ring 22A for a stator assembly 10.

The fingers 24 include sides 34 which each define an angled portion 36. The angled portion 36 assists in guiding the conductors 16 to the desired position between each of the fingers 24. Additionally, the angled portion 36 assists in guiding and in preventing damage to the slot liners 30 during assembly.

The sides 34 of the fingers 24 also each define a chamfer 40. The chamfer 40 is located at the same axial position on the stator stack 12 as the slot liners 30. As mentioned above, the isolator/assembly ring 22A is secured to the stator stack 12 prior to threading of the conductors 16 and the slot liners 30 into the stator stack 12. Thus, the chamfer 40 aligns the slot liners 30 in the desired axial position relative to the stator stack 12. The chamfer 40 also protects the slot liners 30 during assembly of the stator assembly 10 and reduces the stress placed on the ends of slot liners 30 from the conductors 16.

The embodiment described above is for a stator assembly 10 having axially inserted conductors 16. However, the isolator/assembly ring 22 may also be utilized with radially inserted conductors 16 as well.

The sides 34 of the fingers 24 also each define a curved portion 38. The curved portion 38 corresponds to a curve 42 on the conductors 16. On the crown-side 18 of the stator assembly 10, the curved portion 38 assists in aligning the conductors 16 during assembly and preventing movement, i.e. pulling, of the conductors 16 during the twist operation.

Figure 3:
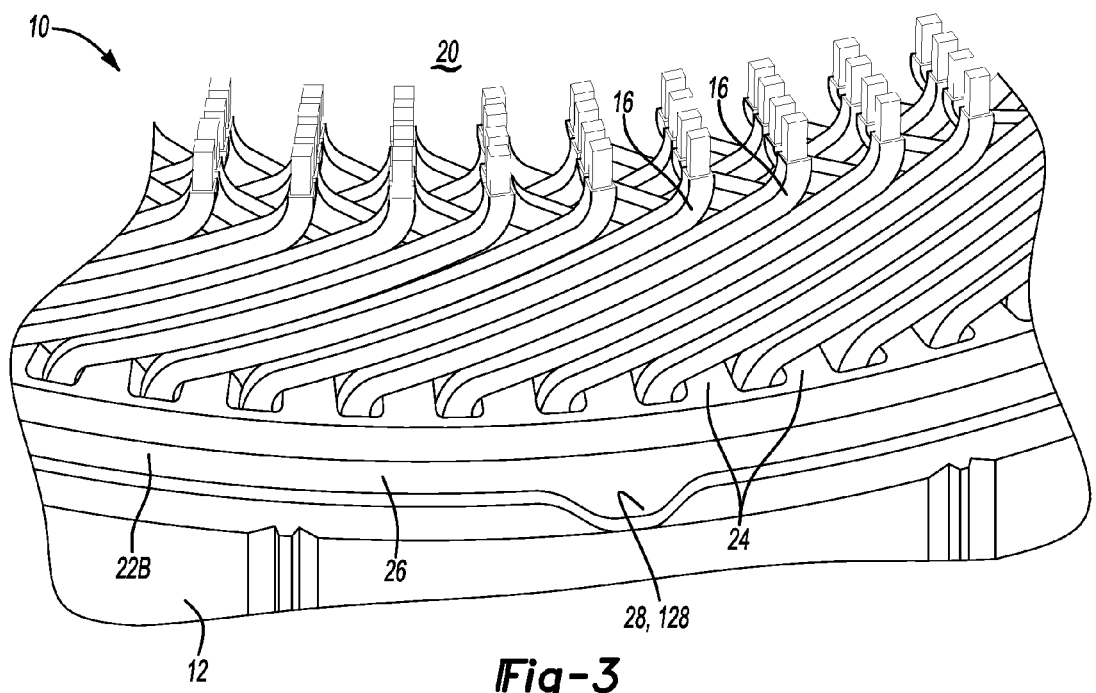
FIG. 3 is a partial schematic perspective illustration of a twist-side of the stator assembly of FIG. 1.

FIG. 3 is a partial schematic perspective illustration of the stator assembly 10 from the twist-side 20 of the of the stator assembly 10. Similar to the crown-side 18 (shown in FIG. 1), the conductors 16 extend from the slots 14 (shown in FIG. 2) defined by the stator stack 12. Another isolator/assembly ring 22B is assembled on the stator stack 12 prior to insertion of the plurality of conductors 16 from the crown-side 18 of the stator stack 12. The isolator/assembly ring 22B may be a common shape with the isolator/assembly ring 22A that is located on the crown side 18 of the stator stack 12.

The isolator/assembly ring 22B has a generally annular shape and is made from an electrically isolating material, such as plastic. The isolator/assembly ring 22B may be injection molded. The fingers 24 protrude radially inward from the main body 26 of the isolator/assembly ring 22B. The attachment features 28 are located around the circumference of the isolator/assembly ring 22B for securing the isolator/assembly ring 22B to the stator stack 12. The attachment features 28 may include various locations about the circumference of the main body 26 for adhering the isolator/assembly ring 22B to the stator stack 12.

Figure 4:
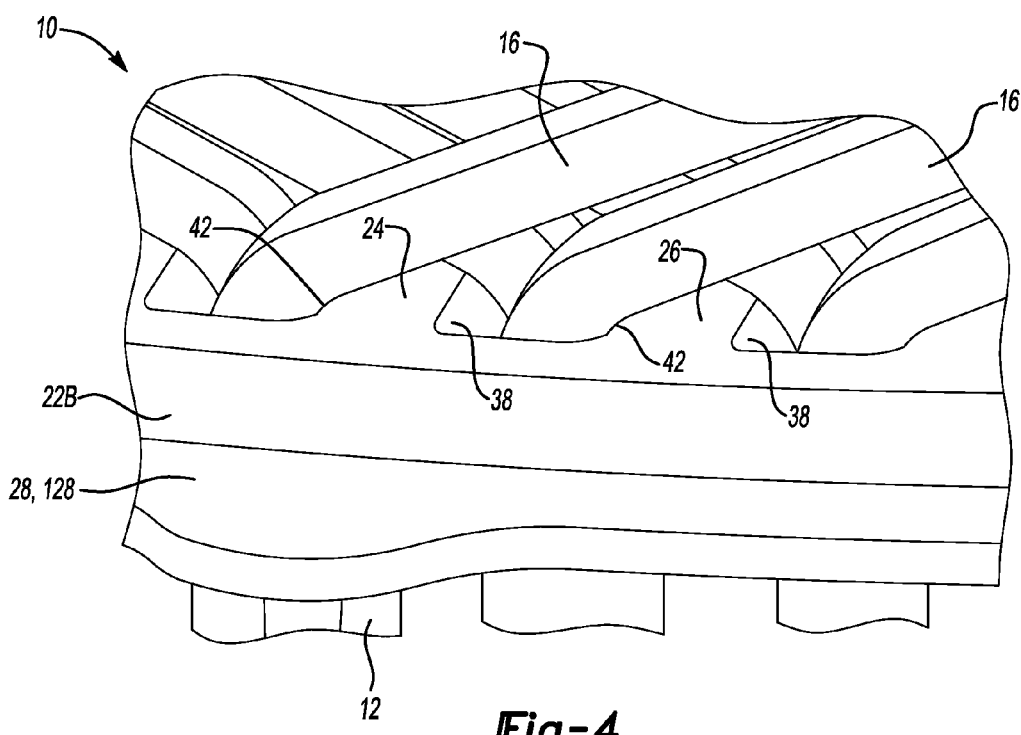
FIG. 4 is a enlarged schematic illustration of a portion of a twist-side of the stator assembly of FIG. 1 and FIG. 3 showing a portion of an isolator/assembly ring and a plurality of conductors.

FIG. 4 is an enlarged schematic side-view illustration of a portion of the twist-side 20 of the stator assembly 10 showing a portion of the isolator/assembly ring 22B looking inward toward the center of the stator stack 12 and the isolator/assembly ring 22B. A plurality of conductors 16 extend from slots 14 in the stator stack 12. The fingers 24 of the isolator/assembly ring 22B extend radially inward from the main body 26 of the isolator/assembly ring 22B. The isolator/assembly ring 22B is secured to the stator stack 12 on the twist-side 20 of the stator assembly 10.

The fingers 24 include sides 34 (shown in FIG. 2) which each define a curved portion 38. On the twist-side 20 of the stator assembly 10, the curved portion 38 assists in guiding the conductors 16 during the twist operation. Additionally, the isolator/assembly ring 22B assists in preventing the conductors 16 from being pulled into the stator stack 12 during the twist operation, which often leads to tearing of the slot liners 30 (shown in FIG. 2).

The curved portion 38 corresponds to a desired curve 42 on the conductors 16. That is, the radius of the curved portion 38 corresponds to the desired radius of a curve 42 on the conductors 16 once the twist operation is complete. The curved portion 38 assists in maintaining a consistent curve 42 on the plurality of conductors 16. Because the isolator/assembly ring 22B is an electrical isolator, the isolator/assembly ring 22B can remain with the stator assembly 10 once the assembly is complete and not effect operation of the stator assembly 10. Therefore, the isolator/assembly ring 22 assists in assembly of the stator assembly 10 to reduce manufacturing time and costs.

Figure 5:
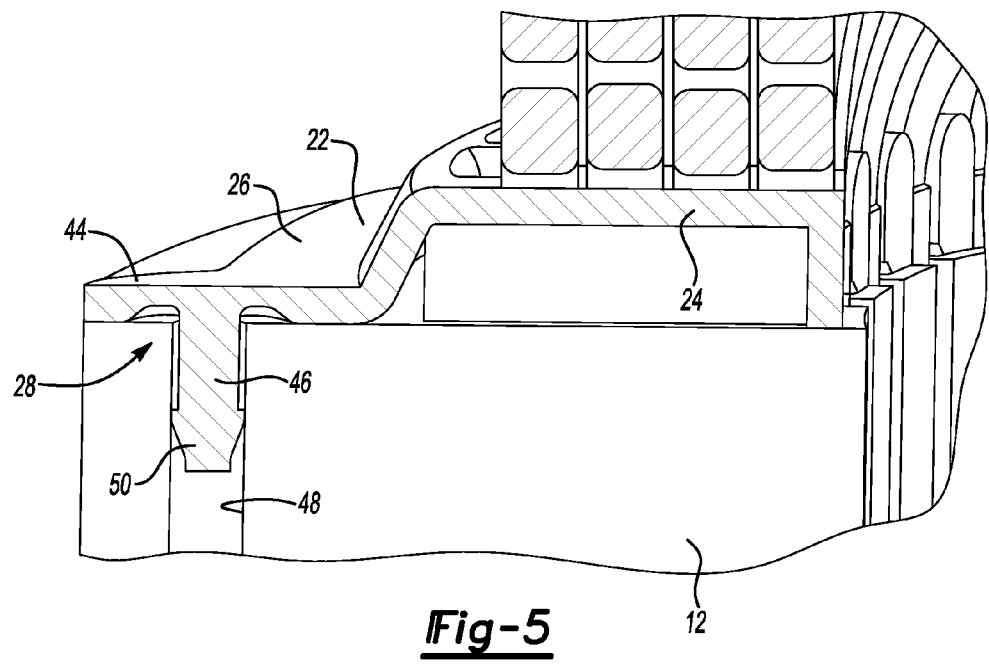
FIG. 5 is a partial schematic cross-sectional illustration of a first embodiment of an attachment feature for the isolator/assembly ring for the stator assembly of FIG. 1 and FIG. 3.

FIG. 5 is a cross-sectional view of the isolator/assembly ring 22 mounted on the stator stack 12 illustrating a first embodiment of the attachment feature 28. The attachment feature 28 includes a tab 44 which protrudes radially outward from the main body 26 of the isolator/assembly ring 22. A pin 46 extends from the tab 44. An attachment hole 48 is defined by the stator stack 12 to receive the pin 46. The attachment hole 48 may be formed, such as during stamping of the stator stack 12, for receiving a pin 46 for each attachment point. The attachment hole 48 may be specially formed for the pin 46 or the pin 46 may be designed to fit into a pre-existing hole in the stator stack 12. Multiple attachment holes 48 may be located about the circumference of the stator stack 12.

The pin 46 defines an enlarged ridged portion 50 to assist in retaining the pin 46 within the attachment hole 48 and assist in securing the isolator/assembly ring 22 to the stator stack 12 during assembly of the stator assembly 10. The enlarged ridged portion 50 has an interference fit with the stator stack 12. Following assembly of the stator assembly 10 including the twist operation, the isolator/assembly ring 22 is also secured to the stator stack 12 by the conductors 16.

The embodiment described above is for a stator assembly 10 having axially inserted conductors 16 using the isolator/assembly ring 22. However, the isolator/assembly ring 22 may also be utilized in isolating and assembling conductors 16 within a stator assembly 10 having radially inserted conductors 16.

Figure 6:
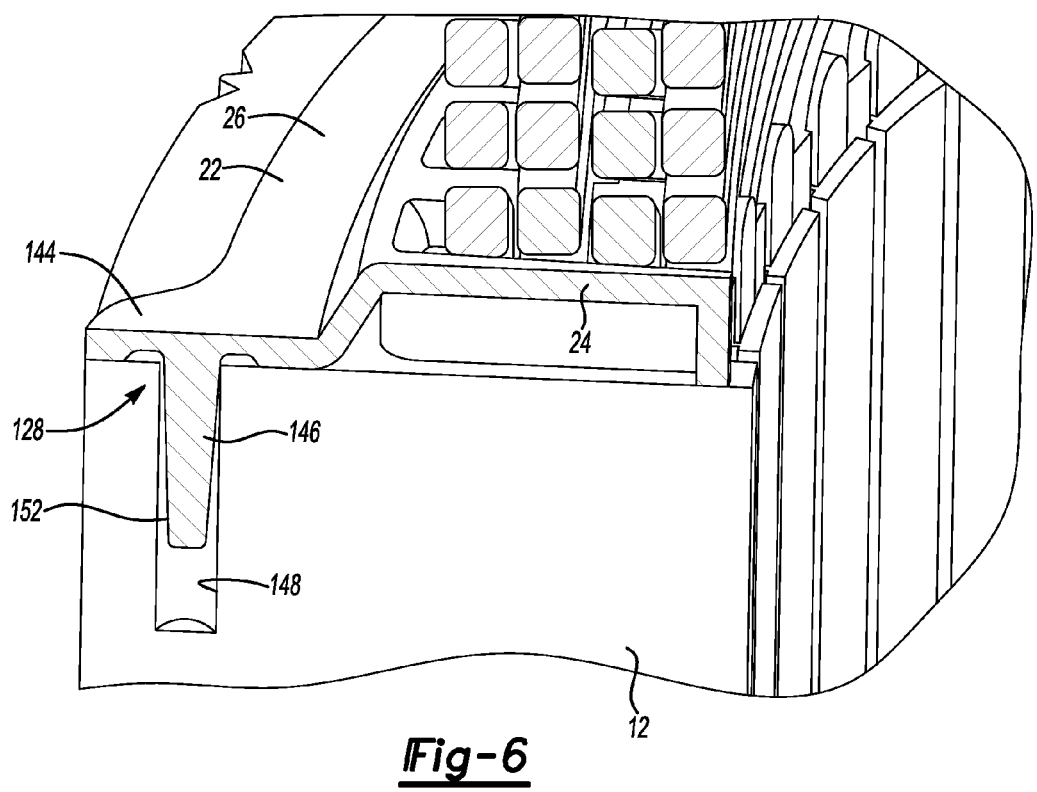
FIG. 6 is a partial schematic cross-sectional illustration of a second embodiment of an attachment feature for the isolator/assembly ring for the stator assembly of FIG. 1 and FIG. 3.

FIG. 6 is a cross-sectional view of the isolator/assembly ring 22 mounted on the stator stack 12 illustrating a second embodiment of the attachment feature 128. The attachment feature 128 includes a tab 144 which protrudes radially outward from the main body 26 of the isolator/assembly ring 22. A pin 146 extends from the tab 144. An attachment hole 148 is defined by the stator stack 12 to receive the pin 146. The attachment hole 148 may be formed for receiving the pin 146 or the pin 146 may be designed to fit into a pre-existing hole formed in the stator stack 12. Multiple attachment holes 148 may be located about the circumference of the stator stack 12.

The pin 146 has a tapered edge 152 to assist in aligning the pin 146 within the attachment hole 148 and to assist in securing the isolator/assembly ring 22 to the stator stack 12 during assembly of the stator assembly 10. Following assembly of the stator assembly 10 including the twist operation, the isolator/assembly ring 22 is also secured to the stator stack 12 by the conductors 16.

Referring to FIG. 5 and FIG. 6, the attachment features 28 and the attachment features 128 may both be included on the same isolator/assembly ring 22 in an alternating arrangement.

While the best modes for carrying out the invention have been described in detail, those familiar with the art to which this invention relates will recognize various alternative designs and embodiments for practicing the invention within the scope of the appended claims.

The invention claimed is:

1. A stator assembly comprising:
   a stator stack;
   a plurality of conductors extending from the stator stack; and
   an isolator ring located on the stator stack, wherein the isolator ring further includes,
   a plurality of inwardly protruding fingers, wherein each of the inwardly protruding fingers is located between respective ones of the plurality of conductors,
   wherein each of the plurality of fingers has sides, each side defining a curved surface located on each side of the plurality of fingers, and
   wherein each side defines an angled portion, which is located opposite from the respective curved surface and abuts the stator stack.

2. The stator assembly of claim 1, wherein each of the plurality of conductors aligns with the curved surfaces located on adjacent ones of the plurality of fingers.

3. The stator assembly of claim 1, wherein each of the plurality of fingers has sides each of which define a chamfer located on the each side of the plurality of fingers.

4. The stator assembly of claim 1, further comprising a plurality of attachment features spaced about a circumference of the isolator ring.

5. The stator assembly of claim 4, wherein the plurality of attachment features each include a pin, and wherein the pin is located within an attachment hole defined by the stator stack.

6. The stator assembly of claim 5, wherein the pin has an interference fit with the stator stack.

7. The stator assembly of claim 5, wherein the pin has a tapered edge to guide the pin to into the attachment hole.

8. A stator assembly comprising:
   a stator stack;
   a plurality of conductors extending from the stator stack; and
   an isolator ring located on the stator stack, wherein the isolator ring further includes,
   a plurality of inwardly protruding fingers, wherein each of the inwardly protruding fingers is located between respective ones of the plurality of conductors,
   wherein each of the plurality of fingers has sides and each side defines a chamfer, and
   wherein a slot liner extending from the stator stack aligns with the chamfer.

9. The stator assembly of claim 8, further comprising a plurality of attachment features spaced about a circumference of the isolator ring.

10. The stator assembly of claim 9, wherein the plurality of attachment features each include a pin, and wherein the pin is located within an attachment hole defined by the stator stack.

11. The stator assembly of claim 8, wherein each side of the plurality of fingers defines an angled portion, which is located opposite from the respective curved surface and abuts the stator stack.

12. The stator assembly of claim 11, wherein each of the plurality of conductors aligns with the curved surfaces located on adjacent ones of the plurality of fingers.

* * * * *